Figure 1:
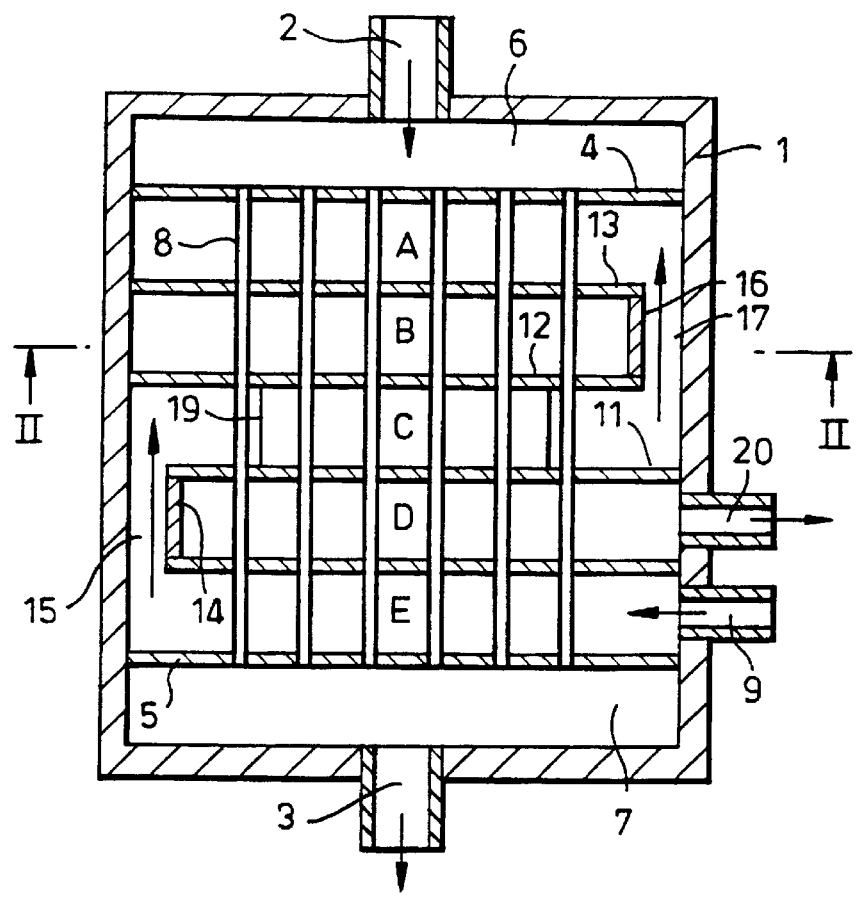

United States Patent [19]
Crewdson

[11] Patent Number: 6,039,113
[45] Date of Patent: Mar. 21, 2000

[54] HEAT EXCHANGE CATALYTIC REACTOR

[75] Inventor: Bernard John Crewdson, Thirsk, United Kingdom

[73] Assignee: Imperial Chemical Industries PLC, United Kingdom

[21] Appl. No.: 09/101,369

[22] PCT Filed: Dec. 6, 1996

[86] PCT No.: PCT/GB96/02999

§ 371 Date: Jul. 9, 1998

§ 102(e) Date: Jul. 9, 1998

[87] PCT Pub. No.: WO97/25136

PCT Pub. Date: Jul. 17, 1997

[30] Foreign Application Priority Data

Jan. 9, 1996 [GB] United Kingdom .................... 9600350

[51] Int. Cl.[7] .................................................. B01J 8/06
[52] U.S. Cl. .............................. 165/159; 165/DIG. 401; 422/201
[58] Field of Search .................... 165/159, 160, 165/161; 422/197, 201, 205

[56] References Cited

U.S. PATENT DOCUMENTS

| | | | |
|---|---|---|---|
| 1,869,973 | 8/1932 | Lucke | 165/159 X |
| 3,731,733 | 3/1973 | Trepaud | 165/161 |
| 3,958,630 | 5/1976 | Smith | 165/161 |
| 4,147,209 | 4/1979 | Persson | 165/161 |
| 4,904,455 | 2/1990 | Karafian et al. | 422/201 |
| 5,382,271 | 1/1995 | Ng et al. | 48/61 |

FOREIGN PATENT DOCUMENTS

| | | |
|---|---|---|
| 2 655 876 | 6/1991 | France . |
| 22 01 528 | 2/1942 | Germany . |
| 43 26 643 | 2/1995 | Germany . |
| 530792 | 12/1940 | United Kingdom .................... 165/159 |
| WO90/06807 | 6/1990 | WIPO . |

*Primary Examiner*—Allen Flanigan

[57] ABSTRACT

A heat exchange catalytic process and reactor of the shell-and-tube type having a plurality of tubes extending longitudinally through the shell from a tube fluid inlet region to a tube fluid outlet region and baffles extending transversely across the shell dividing the shell between said inlet and outlet regions into at least three heat exchange zones through which each tube passes in sequence in heat exchange with that zone. A shell fluid is passed through the heat exchange zones in heat exchange with the tube fluid passing through the tubes. Transfer passages are provided connencting the heat exchange zones and are disposed so that the shell fluid passes through the second zone before or after it has passed through both the first and third zones. A particulate catalyst is disposed in either the shell heat exchange zones or, preferably, the tubes. The process utilises a heat exchange medium, particularly water, that does not change state under the prevailing conditions and is preferably fed to the shell heat exchange zones while the reactant stream passes through the catalyst disposed in the tubes. The process is particularly applicable to the selective hydrogenation of acetylenes in the presence of olefins.

10 Claims, 1 Drawing Sheet

HEAT EXCHANGE CATALYTIC REACTOR

This invention relates to a heat exchange catalytic reactor of the shell-and-tube type wherein a reactant stream contacts a catalyst and undergoes a catalytic reaction while heat is exchanged between the reactant stream and a heat exchange medium.

In many catalytic reactions, whether exothermic, such as hydrogenation, shift, methanation, ammonia synthesis or methanol synthesis reactions, or endothermic reactions such as the reverse shift or steam reforming reactions, it is desirable that the temperature of the reactant stream is controlled during the reaction.

Thus it may be desirable in an exothermic reaction to remove heat from the reactants so as to prevent an unacceptable temperature rise which might cause the reaction to run-away and/or become less selective. To that end it is well known to employ a heat exchange reactor wherein a suitable heat exchange medium is passed in heat exchange with the catalyst bed. Usually the heat exchange medium flows counter-current to the flow of the reactants: examples of heat exchange reactors are disclosed in GB 1 578 270 and U.S. Pat. No. 4,321,234. In some cases, for example as described in the aforesaid U.S. Pat. No. 4,321,234, the heat exchange medium is a fluid which changes state as a result of the heat exchange. For example boiling water or methanol may be used as a heat exchange medium. While such systems may enable good control of the temperature, it is necessary to select a heat exchange medium that undergoes the state change at the desired temperature. While the temperature at which the change of state occurs may be altered by changing the pressure, to achieve the necessary temperature with a given heat exchange medium, it may be necessary to employ such a pressure that the pressure differential between the heat exchange medium and the reactants imposes engineering problems. Furthermore such systems employing a change of state of the heat exchange medium of necessity involve the use of condensers or evaporators elsewhere in the heat exchange medium loop. These add to the expense.

Systems wherein the heat exchange medium does not change state generally offer less precise control of temperature unless the heat exchange medium flow rate is very high. We have devised an alternative system using a heat exchange medium that does not undergo a change of state during the heat exchange.

The type of heat exchange reactor with which the invention is concerned is the so-called shell-and-tube arrangement. The reactants stream, or the heat exchange medium, flows through the tubes and is hereinafter referred to as the tube fluid. The other of the heat exchange medium and the reactants stream flows through the shell space and is hereinafter termed the shell fluid. The reactor has a plurality of tubes extending longitudinally through an elongated shell from a tube fluid inlet region to a tube fluid outlet region. The tube fluid is fed to the tube fluid inlet region via a tube fluid inlet, and passes through the tubes to the tube fluid outlet region from whence the tube fluid is removed via a tube fluid outlet. The shell often has a plurality of baffles, for example as described in the aforesaid GB 1 578 270. to cause the shell fluid to flow through a tortuous, e.g. zig-zag, path from a shell fluid inlet past the exterior surfaces of the tubes, to a shell fluid outlet. However the flow of shell fluid is generally co-current or counter-current to the flow of the tube fluid in the sense that at any point in the tubes, apart from possibly the tube fluid inlet and outlet zones, the tube fluid is brought into heat exchange with shell fluid that has been subject to heat exchange downstream of that point in the case of counter-current flow and upstream of that point in the case of co-current flow. The catalyst may be disposed in the tubes, in which case the reactants will form the tube fluid and the heat exchange medium will form the shell fluid. Alternatively the catalyst is disposed in the shell space so that the reactants form the shell fluid and the heat exchange medium passes through the tubes as the tube fluid.

In the present invention the flow is arranged to be both co-current and counter-current.

Accordingly the present invention provides a heat exchange catalytic reactor of the shell-and-tube type having:
(a) a shell;
(b) a tube fluid inlet region;
(c) a tube fluid outlet region;
(d) a plurality of tubes extending longitudinally through the shell from, and communicating with, said tube fluid inlet region to, and communicating with, said tube fluid outlet region;
(e) a tube fluid inlet to said tube fluid inlet region;
(f) a tube fluid outlet from said tube fluid outlet region; and
(g) baffles extending transversely across the shell dividing the shell between said tube fluid inlet and outlet regions into a plurality of heat exchange zones through which each tube passes, said plurality of heat exchange zones including at least a first, a second and a third heat exchange zone disposed such that the tubes pass through said first heat exchange zone, then through the second heat exchange zone and then through the third heat exchange zone;
(h) a shell fluid inlet communicating with one of said plurality of heat exchange zones;
(i) a shell fluid outlet communicating with another of said plurality of heat exchange zones;
(j) shell fluid transfer passages connecting said plurality of heat exchange zones whereby said shell fluid can pass from said shell fluid inlet through said plurality of heat exchange zones to said shell fluid outlet and so disposed that the shell fluid passes through said second heat exchange zone before or after it has passed through both the first and third heat exchange zones, and
(k) a particulate catalyst disposed in either said tubes or in said heat exchange zones.

The invention also provides a catalytic heat exchange process wherein a reactants stream is passed through a catalyst bed in which a catalytic reaction involving said reactants stream takes place while heat is exchanged between said catalyst bed and a heat exchange medium that does not undergo a change of state under the prevailing conditions, characterised in that the catalyst bed extends through a sequence of at least three heat exchange zones and the heat exchange medium passes through said second heat exchange zone before or after it has passed through both the first and third heat exchange zones of said sequence.

For simplicity the invention will be further described in relation to an exothermic reaction and also with the catalyst disposed in the tubes, i.e. with the reactants as the tube fluid, and using water as the heat exchange medium passing through the shell as the shell fluid. It will be appreciated however that it is equally applicable to endothermic reactions and to arrangements wherein the catalyst is disposed in the shell as opposed to the tubes and/or to the use of other heat exchange fluids.

Thus in the case of an exothermic reaction with the catalyst disposed in tubes, the shell space is divided by baffles into at least three heat exchange zones through which water passes. As the reactants pass through the tubes, heat is exchanged between the reactants and the water in the first zone, then between the reactants and water in the second zone, and then between the reactants and water in the third zone. The water flow however is not the usual counter-current or co-current flow but flows through the second heat exchange zone before or after it has passed through both the first and third heat exchange zones. Thus where the water is fed to the third zone, it passes from the third zone to the first zone and then passes from the first zone to the second zone. It will be seen that in this case the water flow is thus counter-current in so far as the third and first zones are concerned and co-current in so far as the first and second zones are concerned. Equally in other cases, the water flow may be in the reverse direction: thus the feed is to the second zone from whence it flows to the first (or third) zone and then to the other, i.e. third or first, zone.

There may be more than three heat exchange zones: thus there may be one or more other heat exchange zones before the first zone and/or after the third zone and/or between the first and second zones and/or between the second and third zones. The flow between these other zones may be co-current, or counter-current. For the purposes of illustration, in a system with seven zones A B C D E F G through which the tubes pass in sequence. If the shell fluid is fed to zone E and flows through the zones in the sequence E C B A D G F, it is seen that the "second" zone may be considered to be any one of zones B, C, D, E or F. The first and third zones are then as shown in the following table:

| first zone | second zone | third zone |
| --- | --- | --- |
| A | B | D, G or F |
| A or B | C | D, G or F |
| A, B or C | D | E |
| A, B, C or D | E | F or G |
| A, B, C, D or E | F | G |

The sequence in which the shell fluid through the zones will depend on the nature of the reaction and the desired temperature profile. In many cases it may be desirable to have alternating co-current and counter-current flow. Thus in another illustration with six zones A B C D E F through which the tubes pass in sequence, a preferred shell fluid flow sequence is F D B A C E.

Such a sequence may be desirable particularly where the optimum temperature for the reaction is above the reactants inlet temperature. Thus at the reactants inlet temperature the reaction may take place only slowly upon contact with the catalyst: consequently only a little heat is evolved (in the case of an exothermic reaction). If the bulk of the reaction, and hence the greatest amount of heat evolved, takes place in zones B, C and D, the relatively cool water, or other heat exchange medium, entering zone D from the coldest zone, inlet zone F, removes heat evolved in zone D, heating the water somewhat. This heated water from zone D enters zone B where the reaction but may not cool zone B significantly. The heated water from zone B then enters zone A and may serve to heat the reactants to initiate or accelerate the reaction. The water from zone A then enters zone C where the reaction is proceeding rapidly and so serves to keep the temperature of zone C at below the temperature at which the reaction becomes less selective. The heated water from zone C then passes to zone E where the reaction is nearly complete: the heated water in zone E may serve to keep zone E at a temperature sufficient to maintain the reaction in zone E.

Figure 2:
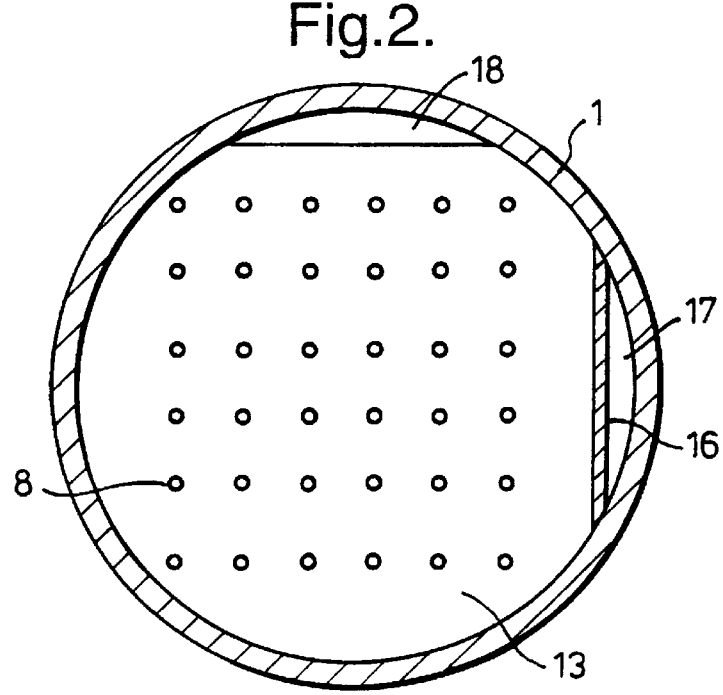

A suitable construction of heat exchange reactor is shown in the accompanying drawing in which FIG. 1 is a diagrammatic sectional view of a reactor having five heat exchange zones and FIG. 2 is a section along the line II—II of FIG. 1.

The reactor comprises an outer vessel 1 provided at its upper end with a reactants, i.e. tube fluid, inlet port 2 and at its lower end with a product, i.e. tube fluid, outlet port 3. Tube sheets 4 and 5 are disposed in the upper and lower ends of vessel 1 to define tube fluid inlet and outlet regions 6, 7 respectively. One or both of the tube sheets may be replaced by manifolds or header pipes connecting the tubes to the tube fluid inlet and/or outlet. Disposed extending between the tube sheets 4, 5 are a plurality of catalyst-filled tubes 8 communicating with the tube fluid inlet and outlet regions 6, 7. The vessel is also provided with a heat exchange medium, i.e. shell fluid, inlet port 9 at a location just above the lower tube sheet 5. A plurality of transverse baffles 10, 11, 12, 13 are provided extending across the shell space within the vessel 1 outside, and sealed to, the tubes 8. The lowest baffle 10 is located just above the shell fluid inlet port 9 and is provided with an upwardly extending wall 14 opposite the inlet port 9. Transverse baffle 10, the wall of vessel 1 and tube sheet 5 define an inlet heat exchange zone E. The upwardly extending wall 14 extends between baffle 10 and the second lowest baffle 11 to form a transfer passage 15 to permit shell fluid to pass from zone E into a heat exchange zone C located above baffle 11. Zone C is defined by the wall of vessel 1, baffle 11, and the third transverse baffle 12. Transverse baffle 12 is provided with an upwardly extending wall 16 on the opposite side of the vessel 1 to wall 14. This wall 16 extends between baffle 12 and the fourth transverse baffle 13 to form a transfer passage 17 to permit shell fluid to pass from zone C into a heat exchange zone A located above baffle 13. Zone A is defined by the wall of vessel 1, baffle 13, and the upper tube sheet 4. A gap 18, shown in FIG. 2, is provided in baffle 13 between the edge of the baffle and the wall of the vessel 1 to form a transfer passage to permit shell fluid to pass from zone A into a heat exchange zone B defined by baffles 12, 13, wall 16 and the wall of vessel 1. On the opposite side of the vessel from gap 18, baffle 12 is provided with a downwardly extending wall 19 connecting baffles 12 and 11 to provide a transfer region to permit shell fluid to pass from zone B to a heat exchange zone D which in turn is defined by the wall of vessel 1, baffles 10 and 11 and wall 14. A shell fluid outlet port 20 is provided in the wall of vessel 1 communicating with zone D.

It is seen that in this arrangement, during their passage down the tubes from the tube fluid inlet region 6 to the tube fluid outlet region 7, the reactants, i.e. tube fluid, are in heat exchange successively with heat exchange zones A, B, C, D and E, while the heat exchange medium, i.e. the shell fluid, flows in counter-current and co-current manner through the heat exchange zones in the sequence E, C, A, B, D.

It will be appreciated that instead of providing the walls 14, 16, 19 to define the transfer passages, the transfer passages may be conduits extending through the wall of vessel 1 and connecting the appropriate heat exchange zones.

The invention is of particular utility for exothermic reactions where only a small proportion of the reactants fed in fact undergo a reaction. An example of such a process is the selective hydrogenation of acetylenes in the presence of olefins. For that reaction the catalyst is usually a precious metal such as palladium supported on an inert oxidic material such as alumina or calcium aluminate cement. The reaction temperature has to be controlled carefully: thus at temperatures above about 90° C. the reaction becomes less selective and a significant proportion of the olefins are liable to be hydrogenated. On the other hand at temperatures below about 60° C., the catalyst exhibits little or no hydrogenation activity. Although the proportion of acetylenes in the reactants stream is generally quite small, less than 5000 ppm by volume, hydrogenation of this quantity of acetylenes releases considerable quantities of heat leading to the possibility of temperatures at which the reaction becomes less selective.

The invention is further illustrated by the following calculated example of acetylene hydrogenation. The reactants feed stream is assumed to have the following composition (% by volume):

| ethylene | 35.00 | butenes | 0.30 | acetylene | 0.50 |
|---|---|---|---|---|---|
| ethane | 30.00 | butanes | 0.20 | methyl acetylene | 0.10 |
| methane | 10.00 | C5+ | 0.50 | propadiene | 0.10 |
| propylene | 4.00 | carbon monoxide | 0.03 | butadiene | 0.01 |
| propane | 1.00 | hydrogen | balance | | |

The gaseous reactants stream is fed at 70° C. and 30 bar abs. to the inlet 2 of a reactor of the type shown in FIGS. 1 and 2 having 150 tubes of internal diameter 70 mm and 10.4 m length giving a total heat exchange surface area of 343 m$^2$. The tubes contains a catalyst comprising palladium supported on alumina. The total volume of catalyst is 6 m$^3$ and the rate of feed of reactants is 50000 kg/h. The heat exchange region of the reactor is divided by baffles into 20 heat exchange zones A–T of equal volume and cooling water is fed at 31.4° C. at a rate of 17000 kg/h to the lowest zone T. The tubes pass through the heat exchange zones in the sequence

A-B-C-D-E-F-G-H-I-J-K-L-M-N-O-P-Q-R-S-T while the water flows through the heat exchange zones in the sequence:

T-R-P-N-L-J-H-F-D-B-A-C-E-G-I-K-M-O-Q-S.

The outlet acetylene concentration, and the outlet reactants and water temperatures, for each zone is shown in Table A. The peak reactants temperature was about 82° C.

For the purposes of comparison the calculations were repeated using the same reactant gas, feed temperature, pressure and reactant gas flow rate, with a reactor of the same see and having the same heat exchange tubes but omitting the baffles so that the coolant entered the vessel at the lowest zone T and flowed in conventional counter-current flow through the zones in the sequence:

T-S-R-Q-P-O-N-M-L-K-J-I-H-G-F-E-D-C-B-A.

The following four comparative cases were considered and the outlet acetylene concentration, and the outlet reactants and water temperatures, for each zone is shown in Tables A and B:

Case C1 The coolant water was replaced by methanol at 60° C. so that the heat exchange medium is maintained at constant temperature as a result of vaporisation of the methanol. This gave a similar peak reactants temperature (about 82° C.) and outlet acetylene concentration (0.2 ppm by volume) to the process of the invention.

Case C2 The coolant was water fed at 31.4° C. and at a rate of 17000 kg/h, i.e. the same as in the process of the invention. This gave a significantly higher peak reactants temperature of about 90° C. which would result in a less selective reaction, i.e. an increased proportion of the ethylene would be hydrogenated to ethane. Essentially all the reaction occurred in the upper half of the reactor and the outlet acetylene concentration was very low (less than 0.01 ppm by volume) indicating that the lower half of the bed was simply acting as a heat exchanger.

Case C3 In order to obtain a similar peak reactants temperature (about 83° C.) to the example of the invention, the coolant water feed rate was increased by about 56% to 26500 kg/h. However the outlet acetylene concentration in this case was about 0.6 ppm by volume. i.e. about twice that obtained with the process of the invention.

Case C4 In order to obtain a peak reactants temperature (about 84° C.) and outlet acetylene concentration (about 0.3 ppm by volume) with the same water flow rate as in the process of the invention, the coolant inlet temperature was decreased to about 7.2° C: thus chilled water had to be used as coolant.

It is seen that the process of the invention can give a temperature profile and outlet acetylene concentration similar to that obtainable with a process employing boiling methanol as a coolant, but without the need for handling vaporised methanol and condensing it for recycle. Processes using simple counter-current reactors with water as a coolant gave higher peak temperatures and hence less selective reactions, or gave higher outlet acetylene concentrations, or required the use of chilled water as the coolant.

TABLE A

| | Invention - Water coolant | | | Comparison C1 - Methanol coolant | |
|---|---|---|---|---|---|
| | Acetylene (ppm | Outlet temp (° C.) | | Acetylene (ppm | Outlet temp (° C.) |
| Zone | by volume) | Reactants | Water | by volume) | Reactants |
| A | 4583.0 | 71.7 | 61.1 | 4583.0 | 71.1 |
| B | 3897.3 | 73.5 | 60.0 | 3897.3 | 72.9 |
| C | 3141.2 | 75.6 | 62.5 | 3142.0 | 74.9 |
| D | 2333.5 | 77.7 | 58.7 | 2339.5 | 77.0 |
| E | 1543.8 | 79.8 | 64.1 | 1550.9 | 79.0 |
| F | 869.4 | 81.0 | 56.9 | 882.3 | 80.6 |
| G | 420.9 | 81.8 | 65.9 | 428.9 | 81.5 |
| H | 181.5 | 81.4 | 54.5 | 188.3 | 81.6 |
| I | 78.3 | 81.3 | 67.5 | 80.8 | 81.2 |
| J | 34.2 | 80.0 | 51.7 | 35.9 | 80.6 |
| K | 16.4 | 79.8 | 68.8 | 16.9 | 79.9 |
| L | 8.2 | 78.2 | 48.7 | 8.5 | 79.1 |
| M | 4.5 | 78.0 | 69.7 | 4.5 | 78.2 |

TABLE A-continued

| | Invention - Water coolant | | | Comparison C1 - Methanol coolant | |
|---|---|---|---|---|---|
| | Acetylene (ppm | Outlet temp (° C.) | | Acetylene (ppm | Outlet temp (° C.) |
| Zone | by volume) | Reactants | Water | by volume) | Reactants |
| N | 2.6 | 76.2 | 45.5 | 2.6 | 77.4 |
| O | 1.7 | 76.0 | 70.4 | 1.6 | 76.6 |
| P | 1.1 | 74.1 | 42.2 | 1.0 | 75.8 |
| Q | 0.8 | 74.0 | 70.8 | 0.7 | 75.0 |
| R | 0.5 | 71.9 | 38.7 | 0.5 | 74.2 |
| S | 0.4 | 72.0 | 70.9 | 0.3 | 73.5 |
| T | 0.3 | 69.7 | 35.2 | 0.2 | 72.8 |

TABLE B

| | Outlet acetylene concentration (vppm) | | | Outlet temperature (° C.) | | | | | |
|---|---|---|---|---|---|---|---|---|---|
| | | | | reactants | | | water | | |
| Zone | C2 | C3 | C4 | C2 | C3 | C4 | C2 | C3 | C4 |
| A | 4574.0 | 4580.7 | 4578.9 | 71.8 | 71.2 | 71.4 | 75.0 | 64.0 | 67.0 |
| B | 3795.3 | 3871.5 | 3851.4 | 74.9 | 73.4 | 73.8 | 75.4 | 63.6 | 66.6 |
| C | 2819.8 | 3065.9 | 3003.4 | 78.6 | 75.7 | 76.5 | 75.6 | 63.0 | 66.0 |
| D | 1681.6 | 2191.9 | 2065.0 | 82.9 | 78.2 | 79.4 | 75.4 | 62.2 | 65.0 |
| E | 648.7 | 1339.8 | 1156.7 | 86.8 | 80.6 | 82.1 | 74.8 | 61.2 | 63.6 |
| F | 133.7 | 665.8 | 490.9 | 89.0 | 82.2 | 83.9 | 73.7 | 59.9 | 61.8 |
| G | 18.1 | 274.0 | 165.1 | 89.6 | 82.8 | 84.3 | 72.2 | 58.5 | 59.5 |
| H | 2.2 | 104.2 | 52.0 | 89.5 | 82.5 | 83.8 | 70.4 | 56.9 | 57.0 |
| I | 0.3 | 41.0 | 17.6 | 89.2 | 81.7 | 82.8 | 68.4 | 55.1 | 54.1 |
| J | 0.0 | 17.6 | 6.7 | 88.6 | 80.5 | 81.4 | 66.2 | 53.4 | 51.1 |
| K | 0.0 | 8.5 | 3.0 | 87.8 | 79.2 | 79.8 | 63.9 | 51.5 | 47.9 |
| L | 0.0 | 4.6 | 1.5 | 86.9 | 77.7 | 78.0 | 61.3 | 49.7 | 44.6 |
| M | 0.0 | 2.7 | 0.9 | 85.7 | 76.1 | 76.0 | 58.7 | 47.8 | 41.1 |
| N | 0.0 | 1.8 | 0.6 | 84.4 | 74.4 | 73.7 | 55.8 | 45.8 | 37.4 |
| O | 0.0 | 1.3 | 0.5 | 82.9 | 72.7 | 71.3 | 52.9 | 43.9 | 33.5 |
| P | 0.0 | 1.0 | 0.4 | 81.2 | 70.8 | 68.8 | 49.6 | 42.0 | 29.5 |
| Q | 0.0 | 0.8 | 0.3 | 79.4 | 69.0 | 66.1 | 46.3 | 40.0 | 25.4 |
| R | 0.0 | 0.7 | 0.3 | 77.3 | 67.1 | 63.3 | 42.8 | 38.0 | 21.1 |
| S | 0.0 | 0.6 | 0.3 | 75.1 | 65.1 | 60.3 | 39.2 | 36.1 | 16.6 |
| T | 0.0 | 0.6 | 0.3 | 72.8 | 63.2 | 57.2 | 35.4 | 34.1 | 12.0 |

What is claimed is:

1. A heat exchange catalytic reactor of the shell-and-tube type having:
   (a) a shell;
   (b) a tube fluid inlet region;
   (c) a tube fluid outlet region;
   (d) a plurality of tubes extending longitudinally through the shell from, and communicating with, said tube fluid inlet region to, and communicating with, said tube fluid outlet region;
   (e) a tube fluid inlet to said tube fluid inlet region;
   (f) a tube fluid outlet from said tube fluid outlet region;
   (g) baffles extending transversely across the shell dividing the shell between said tube fluid inlet and outlet regions into a plurality of heat exchange zones through which each tube passes, said plurality of heat exchange zones including at least a first, a second and a third heat exchange zone disposed such that the tubes pass through said first heat exchange zone, then through the second heat exchange zone and then through the third heat exchange zone;
   (h) a shell fluid inlet communicating with one of said plurality of heat exchange zones;
   (i) a shell fluid outlet communicating with another of said plurality of heat exchange zones;
   (j) shell fluid transfer passages connecting said plurality of heat exchange zones whereby said shell fluid can pass from said shell fluid inlet through said plurality of heat exchange zones to said shell fluid outlet and so disposed that the shell fluid passes through said second heat exchange zone before or after it has passed through both the first and third heat exchange zones, and
   (k) a particulate catalyst disposed in either said tubes or in said heat exchange zones.

2. A heat exchange catalytic reactor according to claim 1 wherein the catalyst is disposed in the tubes.

3. A heat exchange catalytic reactor according to claim 1 wherein said plurality of heat exchange zones include at least one heat exchange zone through which said shell fluid passes before the first zone, after the third zone, between the first and second zones, and/or between the second and third zones.

4. A heat exchange catalytic reactor according to claim 3 wherein there are at least five heat exchange zones.

5. A heat exchange catalytic reactor according to claim 3 wherein the shell fluid transfer passages are disposed to pass the shell fluid through the plurality of heat exchange zones in alternating co-current flow and counter-current flow.

6. A catalytic heat exchange process which comprises passing a reactants stream through a catalyst bed in which a catalytic reaction involving said reactants stream takes place while heat is exchanged between said catalyst bed and a heat exchange medium that does not undergo a change of state under the prevailing conditions, characterised in that the catalyst bed extends through at least a first, a second and a third heat exchange zone so that the reactants pass through the catalyst in the second heat exchange zone after passage through the catalyst in the first heat exchange zone and through the catalyst in the third heat exchange zone after passage through the catalyst in the second heat exchange zone and the heat exchange medium passes through said second heat exchange zone before or after it has passed through both of said first and third heat exchange zones.

7. A process according to claim 6 wherein the catalyst is disposed in tubes extending through the heat exchange zones and the reactants stream is fed to said tubes.

8. A process according to claim 6 wherein the heat exchange medium passes through at least one further heat exchange zone before the first zone, after the third zone, between the first and second zones, and/or between the second and third zones.

9. A process according to claim 6 wherein the catalytic process is the selective hydrogenation of acetylenes in the presence of olefins.

10. A process according claim 6 wherein the heat exchange medium is water.

* * * * *